Nov. 10, 1953  E. W. GREENFIELD ET AL  2,658,939
POWER CABLE CONTAINING FLUID UNDER PRESSURE
Filed July 29, 1948  3 Sheets-Sheet 1

INVENTORS
Eugene W. Greenfield
Amos C. Connell
BY
Pennie Edmonds Morton & Barrows
ATTORNEYS Nov. 10, 1953  E. W. GREENFIELD ET AL  2,658,939
POWER CABLE CONTAINING FLUID UNDER PRESSURE
Filed July 29, 1948  3 Sheets-Sheet 3

INVENTORS
Eugene W. Greenfield
Amos C. Connell
BY
ATTORNEYS

Patented Nov. 10, 1953

2,658,939

UNITED STATES PATENT OFFICE 2,658,939

POWER CABLE CONTAINING FLUID UNDER PRESSURE

Eugene Willis Greenfield and Amos Clarendon Connell, Hastings on Hudson, N. Y., assignors to Anaconda Wire and Cable Company, a corporation of Delaware Application July 29, 1948, Serial No. 41,215

10 Claims. (Cl. 174—24)

This invention relates to power cables, and is directed particularly to the provision of an improved power cable of simple construction for conducting heavy currents at fairly high voltages. The characteristic features of the new cable reside in the provision of a thick-walled monolithic extruded tubular layer of plastic material as the primary insulation surrounding the conductor, and in the provision of a fluid exerting a superatmospheric pressure on both the inner and outer surfaces of such insulating layer, the magnitude of the pressure being the same on both such surfaces.

Power cables for main power distribution circuits generally have one or more conductors each insulated with a considerable number of wrappings of paper tape. The paper is impregnated with a good grade of mineral oil, and the assembly of insulated conductors is enclosed in an extruded lead sheath. Cables of this type have been extensively used, for oil-impregnated paper is the best dielectric heretofore commercially suitable for power cable insulation. However, the manufacture of such oil-impregnated cables requires the greatest of care to insure complete saturation of the paper tape with the oil, and the cable must be sheathed with lead promptly after it has been impregnated.

Cables of the oil-impregnated type are subject to one serious weakness: any pin-hole sized void that develops within the oil-impregnated paper-tape insulation constitutes a focal point for ionization within the dielectric, resulting in a concentration of electrical stress at the void which in time causes the insulation to break down. Voids usually result from the fact that the oil expands when the cable heats up during periods of heavy electrical loading, and contracts again when the cable cools during periods of light electrical loading. Power distribution cables are subjected to daily fluctuations in the load they are called upon to carry (the demand for power usually being greatest in the early evening hours and least in the early morning hours), and the daily expansion and contraction of the oil-impregnated paper-tape insulation caused by such load cycles is conducive to ultimate development of voids within the insulation. Also, whenever the cable is run vertically or at a substantial angle to the horizontal, void formation quite commonly occurs because of the migration of the oil under the force of gravity. Riser sections (as vertical or steeply sloping sections of the cable are called) are necessary in almost all cable installations and are one of the most important and difficult to overcome contributors to void formation in oil-paper insulated cables.

Various proposals have been made and adopted to minimize or prevent void formation. For example, power cables are sometimes made with provision for maintaining oil or gas under pressure in a channel provided for the purpose between the cable sheath and the insulation. Oil under pressure within the cable sheath is supposed to insure that the oil-impregnated paper tape will be kept saturated with oil at all times; and gas under pressure within the cable sheath is supposed to insure that when the cable cools and the dielectric contracts, oil will be forced into any voids that tend to form. These proposals have been moderately successful, but they do not completely solve the problem, and do not in any way overcome the manufacturing difficulties and expense inherent in making oil-impregnated cable.

It has been recognized that void formation could be overcome by making the dielectric of some non-fluid material in which voids could not form either in riser sections or because of daily variations in the load cycle. Plastic materials, such as polyethylene, natural and synthetic rubbers, polyvinyl chloride, etc., are materials that theoretically are suitable and that have in fact been used for the insulation of small wires. Unfortunately it is practically impossible to extrude or otherwise apply such material about a conductor, in the form of an insulating layer having the wall-thickness required for large power cable insulation (⅛ inch or more), without having any voids therein. Void spaces in an extruded insulating layer of plastic material are as objectionable and lead to the same difficulties as voids in an oil-impregnated paper-tape insulation.

In the course of an extensive study of void formation in thick-walled extruded plastic insulating layers, we have observed that voids most commonly occur close to the conductor. This is particularly noticeable with polyethylene, a plastic that has especially desirable dielectric properties. Thin layers of this material may be extruded about small wires without much difficulty, but thick layers (⅛ inch or more) about large-diameter conductors (say larger than ½ inch in diameter), such as are required for major power distribution cables, invariably tend to pull away from the conductor about which they are extruded, leaving numerous bubbles (voids) in the immediate vicinity of the conductor. Normally these bubbles constitute focal points for electrical breakdown. We have discovered, however, that if a gas or other fluid at a superatmospheric pressure is applied both inside and outside a plastic insulating layer of this character, thereby putting the gas trapped in the bubbles under pressure, the bubbles no longer constitute points of serious dielectric weakness. If the pressure is applied only to the outside of the plastic layer, it is substantially ineffective for minimizing the adverse effect of the voids; and if it is applied only to the inside of the dielectric layer, it is only moderately effective, and its effectiveness decreases steadily with the passage of time.

Based on these observations and discoveries, the improved power cable of the invention comprises a conductor that is fluid-permeable throughout its length, surrounded by a layer of solid, fluid-impermeable plastic insulation. The insulated conductor is surrounded by a sheath which is spaced from the insulation somewhat to provide a fluid passage therebetween throughout the length of the cable. Fluid under superatmospheric pressure is provided within the conductor so as to exert pressure on the inner surface of the insulation adjacent the conductor, and fluid under essentially the same superatmospheric pressure is provided in the aforesaid fluid passage to exert on the outer surface of the insulation substantially the same pressure as is exerted on the inner surface thereof. The fluid preferably used is a gas (air, for example, is often satisfactory), and the pressure required is moderate—it should be above five pounds per square inch and may be thirty pounds or more per square inch above atmospheric, but advantageously approximates twenty pounds per square inch. The plastic insulation which is employed in the cable of the invention is extruded or otherwise formed as a monolithic tubular layer about the conductor, and most advantageously is solid polyethylene plastic. The conductor is preferably stranded, as this is the most convenient way to make it permeable transversely and throughout its length to the flow of a gas or other fluid, but it may instead comprise a fluid-permeable tube, such as a perforated tube or a loosely formed strip-wound tube.

The invention contemplates the incorporation of a cable of the character described in a power cable installation. In such an installation, a cable fitting having a gas-tight casing is secured in gas-tight relation to the cable sheath at one end of a length of the cable. The cable conductor extends into the interior of the fitting and therein is bared of insulation over a short portion of its length. The gas passages of the cable, between the cable sheath and the outer surface of the insulation, also communicate with the interior of the fitting casing. A source of gas at a superatmospheric pressure is connected with the interior of the fitting casing, and thereby gas under the same superatmospheric pressure is admitted both to the interior of the conductor through the bared portion thereof and to the cable gas passage, so that it exerts essentially the same superatmospheric pressure on both the inside of the plastic insulation layer adjacent the conductor and on the outside thereof adjacent the sheath.

The foregoing and other features of the invention are described below with reference to the accompanying drawings, in which Fig. 1 is a cutaway view of a three-conductor cable of simple design constructed in accordance with the invention;

Fig. 5a is a sectional elevation of a termination for a single conductor cable according to the invention.

Figure 1:
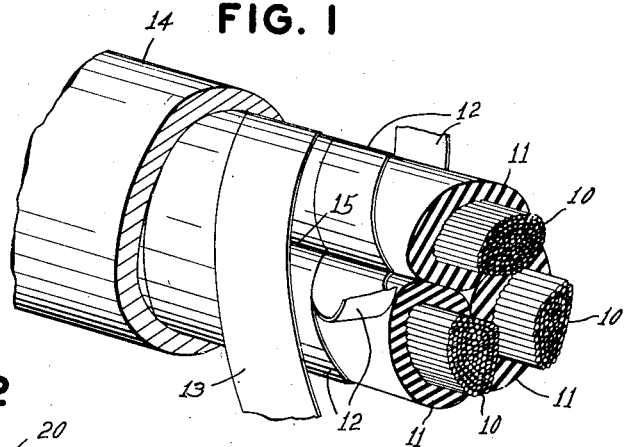

The cable shown in Fig. 1 comprises three sector-shaped stranded conductors 10 each insulated with a monolithic layer 11 of a solid, fluid-impermeable plastic. The plastic preferably is applied by extrusion in tubular form about each conductor. For power cables designed to operate up to 25,000 volts, the insulating layer 11 should have a wall thickness between 1/8 inch and 1/4 inch. Polyethylene is a particularly desirable material to employ for making the insulating layer 11, because it has excellent dielectric properties, good mechanical properties, is readily extruded, and is not too expensive. However, other fluid-impermeable, flexible plastic materials, such as natural rubber or synthetic rubber, or other rubber-like plastics, such as polyvinyl chloride or the copolymer of vinyl chloride and vinyl acetate, may be used. Among the synthetic rubbers, butyl rubber (a copolymer of isoprene and isobutylene) is particularly advantageous on account of its good electrical properties.

Conventional extrusion apparatus of the character used in the wire industry may be employed for forming the insulating layer 11. Some difficulty may be encountered in keeping the conductor 10 accurately centered within the rather thick-walled layer of insulation, but this is primarily a mechanical difficulty that can be met by properly designing, setting up and operating the extrusion apparatus.

Each insulated conductor has a thin metallic shielding tape 12 wrapped helically about it to equalize the electrical stress throughout all parts of the insulation, and a metallic binder shield tape 13 surrounds the grouped individually shielded conductors. An extruded lead sheath 14 encloses the entire assembly.

Since the conductors 10 are stranded, they are readily permeable both longitudinally and transversely to the flow of gas, and the invention contemplates supplying gas or other fluid at a superatmospheric pressure, above five pounds per square inch, and in many cases advantageously approximating twenty pounds per square inch, to the interior of each of these conductors. The gas thereby is enabled to exert a superatmospheric pressure on the inner surface of the tubular plastic insulating layer 11.

No filler is laid in the valley spaces 15 between the insulated conductors, and the sheath 14 is spaced from the shielded insulation in the regions of these valley spaces. Thus the valley spaces define gas passages exterior to the insulation 11 but inside the sheath 14, to which gas is supplied at the same superatmospheric pressure as to the interior of the stranded conductors 10. In this manner the plastic insulation 11 is subjected both inside and outside to the same gas pressure, with the result that any voids or bubbles inadvertently produced when the insulation is extruded are prevented from constituting points of dielectric weakness at which the insulation might fail under electrical stress.

The absence of fillers in the valley spaces 15 causes the sheath 14 to assume a flattened, somewhat triangular cross section. If it is desired to have the sheath rounded out, a small porous-wall tube, such as a tube formed by helically winding a metal strip into tubular form with open spaces between adjacent turns of the strip (such, for example, as is shown in Fig. 1 of U. S. Patent No. 2,253,986), may be laid in the valley spaces in lieu of conventional jute fillers.

Figure 2:
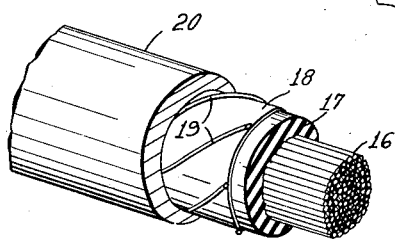
Fig. 2 is a similar cutaway view of a single-conductor cable.

Fig. 2 shows a single-conductor cable made in accordance with the invention, having a single stranded conductor 16 surrounded by an extruded monolithic tubular layer of insulation 17, made of a solid, fluid-impermeable plastic, preferably polyethylene. A shielding tape 18 of thin copper strip or other metal is wound helically about the insulation. A number of widely spaced skid wires 19 then are wound helically about the shield tape, and a lead sheath 20 is extruded thereover. The skid wires 19 serve to space the insulated conductor from the sheath 20, thereby forming an annular gas passage throughout the length of the cable between the sheath and the outer surface of the shielded insulation. The stranded conductor 16 is permeable to gas or other fluid, and in accordance with the invention, gas under the same superatmospheric pressure is supplied both to the inner surface of the tubular insulating layer 17 through the fluid-permeable stranded conductor 16, and to the outer surface of the insulating layer through the annular gas passage.

Figure 3:
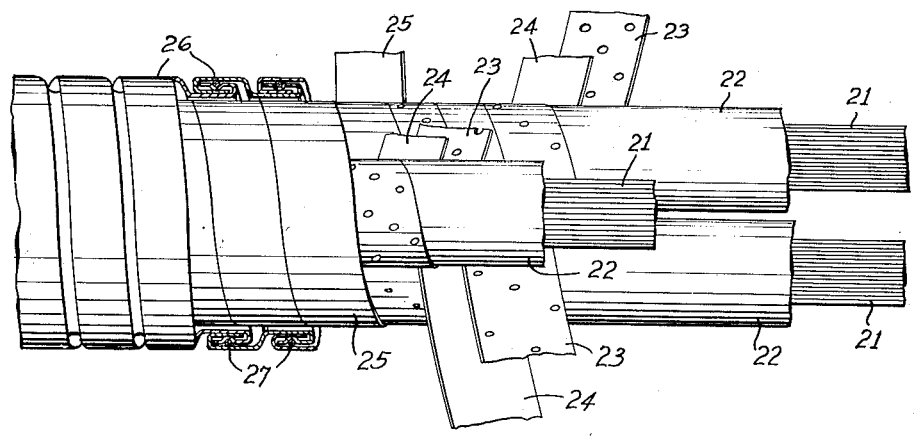
Fig. 3 is a cutaway side view of a particularly advantageous modified form of a three-conductor cable.

The cable shown in Fig. 3 is generally similar to that shown in Fig. 1. It comprises three stranded conductors 21 each surrounded by a monolithic tubular insulating layer 22 of extruded plastic material, such as polyethylene. Each insulated conductor is provided with electrostatic shielding comprising a perforated thin gauge copper tape 23 intercalated with a tape of carbon-black-impregnated paper 24 and wrapped helically about the insulating jacket. The assembled conductors are bound together by a binder tape 25 and are enclosed within a loosely fitting flexible strip wound interlocked metal hose 26, which serves as a sheath for the cable. The hose 26 shown in Fig. 3 is of the packed type, in which a packing string 27 is laid in the interlocking joint to reduce the danger of fluid leaking through this joint. However, unpacked strip wound hose can be made tight enough for use as the sheath for cable according to the invention.

The shielding tapes 23 and 24 of the cable shown in Fig. 3 serve (as do the shielding tapes shown in the other figures) to equalize the potential at the surface of the insulation and to insure that this will be ground potential. They function in the usual manner to carry away charging currents and to insure equal distribution of electrical stress throughout the insulation when the cable is operating. The binder tape 25 is advantageously of copper, to insure good electrical contact between the shield tapes about the individual insulated conductors and good electrical contact between these shield tapes and the sheath. However, the chief function of the binder tape is to hold the assembly of conductors together before applying the sheath, and other materials (even non-metallic materials) may therefore be used for the tape 25. Even a non-metallic tape will hold the several insulated conductors together well enough to insure good electrical contact between the several individual shielding tapes 23, 24 and can do so without preventing the shield tapes from being electrically in contact with the sheath.

The strip wound hose 26 is a particularly advantageous form of sheath, because it is more flexible than a lead sheath and is less expensive. It can be used with especial advantage in substations, in leads to switchboards, etc. The loosely fitting hose-sheath may be formed in place about the cable, or the assembly of insulated and shielded conductors may be drawn into it after it has been formed. The latter feature is particularly desirable, as the hose may be permanently installed wherever the cable is to be used, and the conductors may be drawn into it after such installation has been made.

In accordance with the invention, gas under pressure is supplied both to the interior of the stranded conductors 21 and to the space between the sheath and the assembly of conductors, so that pressure is exerted both on the inside and outside of the several individual insulating layers 22. The shielding tapes do not interfere with effective equalization of pressure on both inside and outside of these layers.

Figure 4:
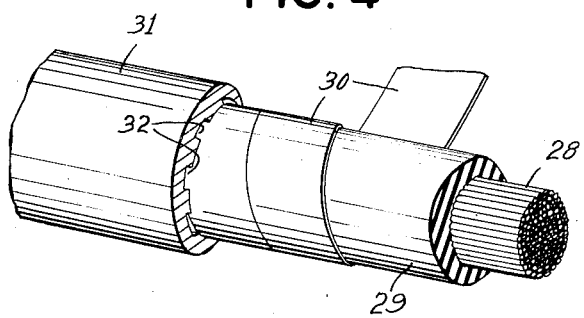
Fig. 4 is a cutaway perspective of a modified form of single-conductor cable.

Fig. 4 shows a single-conductor cable having a stranded conductor 28 about which a thick-walled tubular layer 29 of extruded plastic insulating material is applied. A strip of thin-gauge copper tape 30 is wound helically about the insulated conductor to provide electrostatic shielding. The insulated conductor is enclosed within an extruded lead sheath 31 formed interiorly with a fluted surface to provide gas passages 32 extending throughout the length of the cable between the sheath and the outer surface of the insulation. Gas under pressure is supplied to these gas passages and to the interior of the stranded conductor 28, thereby to exert a superatmospheric pressure both on the inside and on the outside surfaces of the tubular layer of insulation.

Figure 5:
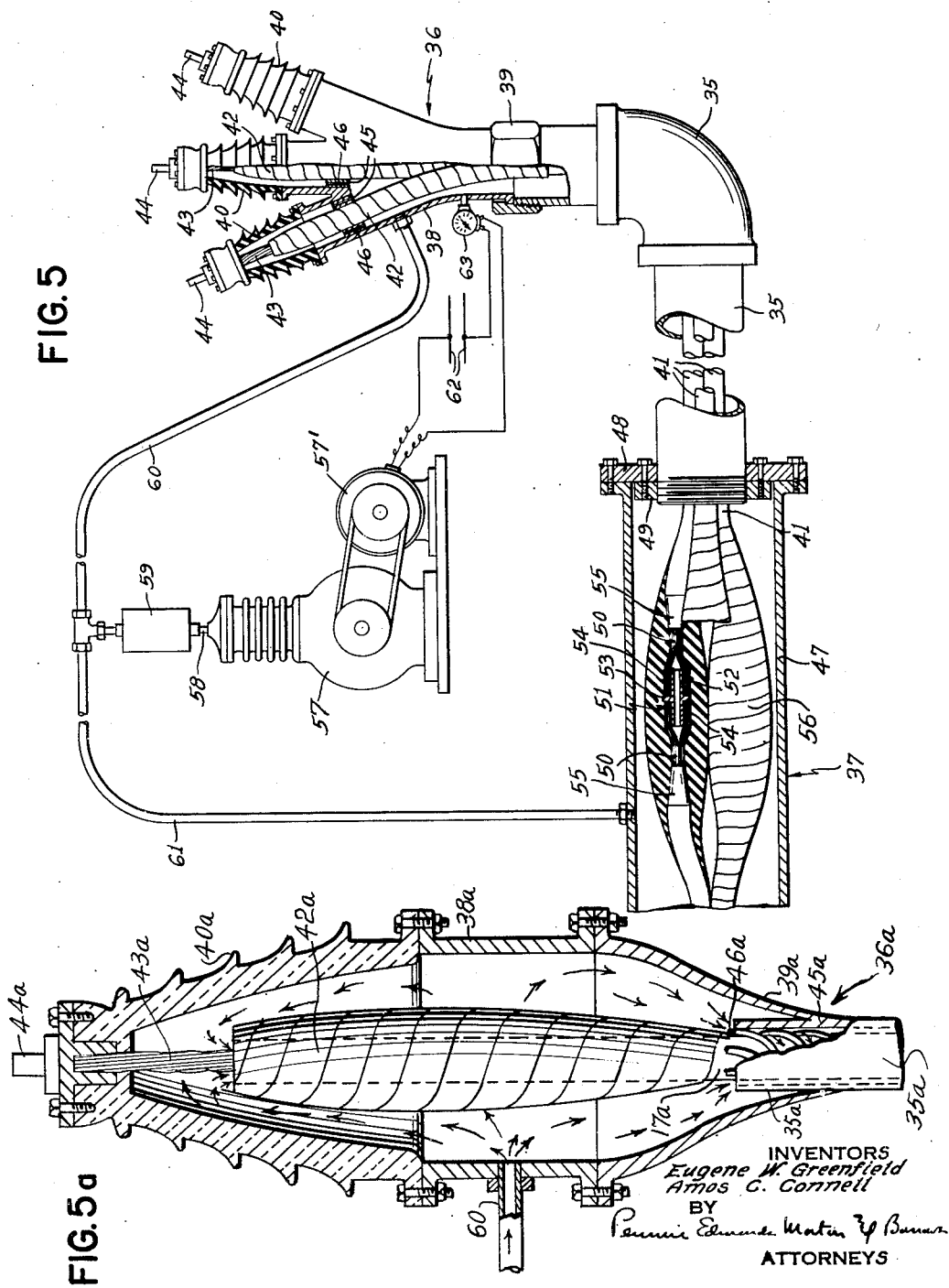
Fig. 5 shows diagrammatically a cable installation according to the invention.

Fig. 5 shows a typical three-conductor cable installation in accordance with the invention. In this installation, the sheath for the cable is in the form of rigid piping 35 (although sheaths of of any of the other forms previously described could also be employed). The installation is shown as comprising a terminal fitting 36 and a joint fitting 37. The terminal fitting 36 is a more or less conventional pot-head having a gas-tight casing 38 clamped in gas-tight relation to the pipe-sheath by a union nut 39. The pot-head is branched and provided with three insulating bushings 40 through which the cable conductors are brought out for purposes of making electrical connections to them. The three insulated conductors 41 extend beyond the pipe-sheath 35 into the terminal fitting 36 and on up into the insulating bushings 40. Terminal dielectric reinforcements 42, either taped-on or factory-prepared condenser type reinforcements, are applied over the factory-extruded layer of conductor insulation to protect against terminal electrical stresses. High up in the bushings 40 the conductors are bared of insulation to expose short lengths 43 of the stranded metallic conductor. The bared conductors are connected at their ends in the usual manner to the terminal stems 44 mounted at the tops of the insulating bushings 40. Sometimes it is advantageous to hold the several insulated conductors centered in the pot-head branches by insulating sleeves 45. These sleeves are formed with openings 46 to permit the flow of gas through them.

The joint fitting 37 comprises a flanged sleeve 47 bolted through a ring 48 to a flange 49 screw-threaded on the pipe-sheath, whereby the pipe-sheath and sleeve are connected in gas-tight relation. The joint fitting 37 is installed at places where a cable joint is required. The joint is made by baring the end portions 50 of the conductors that are to be connected, and opening the strands of these bared end portions enough to insert a through-type connector 51. This connector comprises a tubular body 52 having a central flange 53 against which the ends of the conductor strands abut. Solder is applied to the strands at 54 where they overlie the connector, in order to make a good electrical connection between the two lengths of conductors. The factory-applied extruded plastic insulation is penciled (i. e. cut back on a taper) in the region 55 of the joint, and tape or other joint insulation 56 is applied in the usual manner and in whatever amount and geometry is best suited to the operating voltage of the system. The through-type connector 51 insures an open gas passage from the interior of the stranded conductor of one length of cable to the interior of the stranded conductor to which it is joined in the other length of cable.

Except for the terminal reinforcement 42, the joint insulation 56, and similar specially insulated sections of the cable installation, the insulation about the conductors consists, as described above, of a monolithic tubular layer of solid extruded plastic composition (advantageously polyethylene plastic). The assembly of insulated conductors fits rather loosely in the pipe-sheath 30 (as well as in the terminal casing 38 and joint sleeve 47), and in fact may be drawn into the pipe-sheath after it has been permanently installed. The space between the insulated conductors and the loosely fitting pipe-sheath forms a gas passage extending throughout the length of the sheath, which passage is in communication with the interior of the terminal casing 38 and the interior of the joint sleeve 47.

An air compressor 57 driven by an electric motor 57' is provided for supplying air under pressure to both the inside and outside of the layer of plastic insulation surrounding each cable conductor. To this end, the air-discharge pipe 58 from the compressor is connected through a desiccating column 59 (for drying the compressed air) to an air-supply pipe 60 which is connected with the interior of the terminal casing 38. The dry compressed air thus applied passes both into the gas passage between the pipe-sheath and the outer surfaces of the insulated conductors, and (through the bared end portions 43) into the interior of the gas-permeable stranded conductors. Where deemed desirable, the air compressor may be connected through a pipe 61 directly to the interior of the joint sleeve 47. Air admitted to the joint sleeve passes through the gas passage between the pipe sheath and the insulated conductors to the terminal fitting, where it accumulates at essentially the same pressure as when admitted directly thereto; and thence it enters the interior of the conductor through the bared end portions 43. In either case air under the same superatmospheric pressure thereby is supplied to and acts on both the inner and outer surfaces of the plastic insulating jacket about each conductor.

Once the system has been installed and a suitable pressure of compressed air has been built up inside the installation, the drop in pressure will be very slow and due only to such minor leaks as result from imperfect installation. Consequently, the capacity of the compressor 57 may be very small, and it need not run continuously. To insure maintaining a desired superatmospheric pressure within the installation, however, even when small air leaks develop, the compressor motor 57' may be connected with a power supply line 62 through a conventional combined pressure gauge and pressure actuated switch 63, connected so that the compressor motor is started whenever the air pressure within the cable system drops below some minimum value determined beforehand as the lowest safe value, and stops again when the desired maximum pressure has been restored.

Fig. 5a shows an alternative form of a cable installation in which a single conductor cable, insulated with a factory-applied layer of extruded fluid-impermeable plastic insulation 17a and having a lead sheath 35a (instead of a pipe sheath as shown in Fig. 5), is assembled with a fluid-tight terminal fitting 36a. The terminal installation of Fig. 5a is made by stripping the lead sheath 35a back from the insulated conductor for a considerable distance and then applying the usual taped-on terminal reinforcement insulation 42a over the factory-applied insulation. An end portion 43a of the stranded conductor is allowed to remain bare; and the tip of this bared portion is soldered into a terminal stem 44a bolted to the top of a porcelain insulator bushing 40a while the remainder is exposed to the interior of the bushing. The bushing is bolted to a terminal casing 38a, which in turn is bolted to a lead skirt 39a. This skirt is wiped to the lead cable sheath 35a, the wiped joint 45a being gas-tight as is the entire terminal fitting 36a.

Skid wires 46a, which are employed in the cable to space the impermeable plastic insulating layer 17a from the extruded lead sheath 35a and to form a gas passage therebetween (as described above in connection with Fig. 2), are cut off at approximately the same point to which the lead sheath has been stripped. Gas from a source under super-atmospheric pressure is introduced into the interior of the terminal fitting 36a through a pipe 60. The compressed gas thus supplied passes simultaneously into the interior of the stranded conductor at its bared portion 43a and into the gas passage between the impermeable plastic insulating layer 17a and the extruded lead cable sheath 35a; and thus an equal super-atmospheric pressure is applied on both the inside and the outside of the cable insulation. It will be noted that the assembly of Fig. 5a is mechanically equivalent to and functionally the same as the assembly of pipe-sheathed cable to terminal fitting 36 of Fig. 5.

It is one of the advantages of the new cable and of installations in which it is used that ordinary dry air may be employed for maintaining the requisite gas pressure on the plastic insulating jacket. Especially when polyethylene is employed as the plastic from which the jacket is extruded, dry air has no deleterious effect thereon. The same is true almost in as great a degree when the insulating jacket is composed of other substantially inert plastic compositions, such as butyl rubber and polyvinyl chloride. The resulting suitability of a small air compressor for maintaining gas pressure within the system leads to substantial operating economies, for such compressors are inexpensive and require neither much attention nor periodic replenishment of a supply of compressed gas. However, in cases where the use of an inert gas is deemed advisable to insure against any chemical attack on the material of which the conductor insulation is composed, flasks of compressed inert gases, such as carbon dioxide, nitrogen, etc., may be used in lieu of the motor-driven compressor, and such flasks may be provided with conventional pressure-regulating valves to insure maintaining the proper gas pressure within the cable system.

The pressure of the gas acting on the cable insulation of the cable should be at least five pounds per square inch above atmospheric, and may advantageously range up to thirty pounds per square inch and even much higher. When a steel pipe is used as the cable sheath, as shown in Fig. 5, quite high pressures may be used safely. If an extruded lead alloy sheath with the conventional one-eighth to three-sixteenths inch wall thickness is used, however, it is best to limit the gas pressure to a maximum of twenty-five pounds per square inch, and in fact we have found that pressures approximating twenty pounds per square inch (e. g. between fifteen and twenty-five pounds per square inch above atmospheric) often give substantially as satisfactory results as very considerably greater pressures. Pressures of this magnitude are easily maintained within cable installations sheathed with a good lead alloy or with an interlocked flexible metal hose, as well as with rigid pipe. In general we prefer to employ the minimum gas pressure which suffices to suppress essentially all ionization within the structure of the conductor insulation. This minimum pressure is a function of the applied voltage and of the character and thickness of the insulation layer. Consequently some cable installations according to the invention may best be served by gas pressures very considerably higher than any particularly mentioned above.

Figure 6:
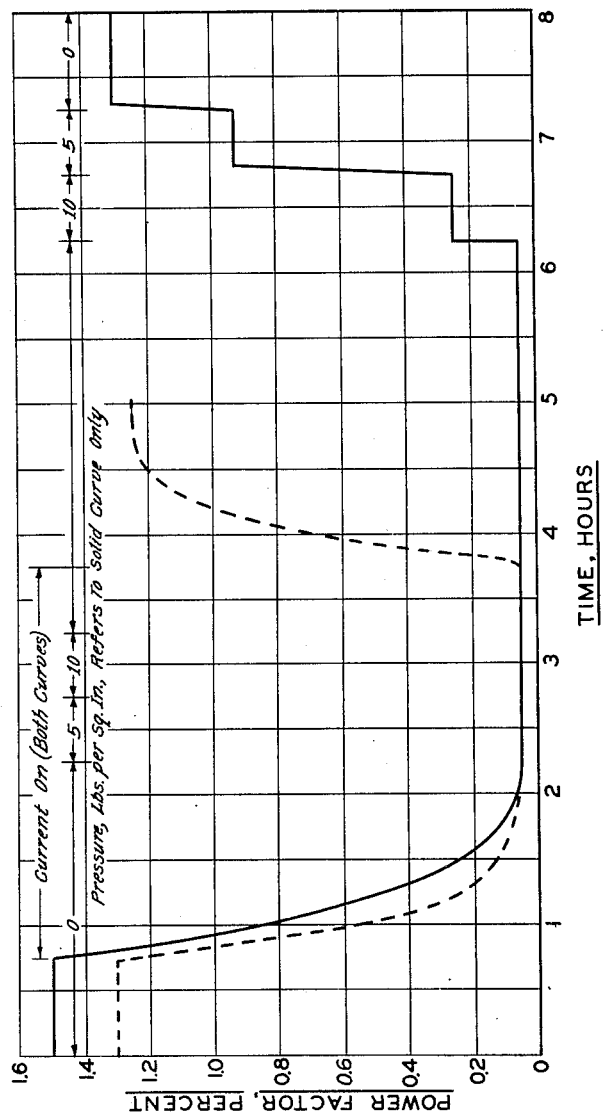
Figs. 6 and 7 are graphs showing the improved characteristics of the new cable.
Figure 7:
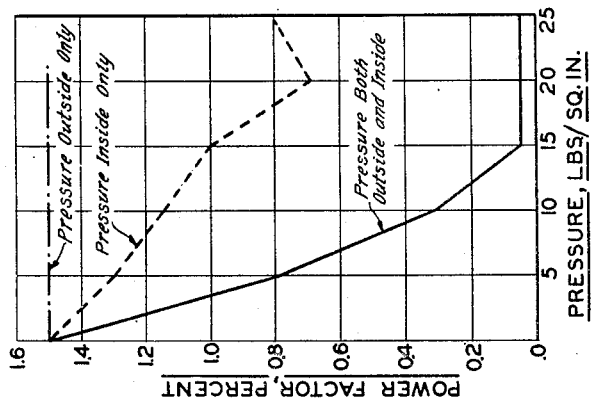

The remarkable results attained in a cable installation made in accordance with the invention is apparent from a consideration of the data presented graphically in Figs. 6 and 7. Fig. 6 shows how the power factor of a cable under high voltage stress varies with time and with the passage through it of a fairly heavy current. The dashed curve of Fig. 6 refers to a cable installation in which no provision was made to supply compressed gas to it. The solid curve refers to a cable installation substantially identical with that of the dashed curve, but arranged in much the same manner as described above with reference to Fig. 5 to permit control over the gas pressure applied both to the inside and to the outside surfaces of the conductor insulation. In both cases, the cable installation consisted essentially of a stranded copper conductor insulated with a monolithic extruded tubular layer of polyethylene having a wall thickness of $\frac{5}{32}$ inch.

Referring first to the dashed curve, the cable was subjected to a voltage stress of 97 volts per mil of insulation thickness (a total applied voltage near 15,000), but substantially no current was passed through it, from zero hour to ¾ hour. During this period (and throughout the test) the power factor of the cable was measured at frequent intervals by an automatic recording power factor indicator, and was found to remain approximately constant at 1.3%. At ¾ hour a heavy current was passed through the cable, full voltage stress being maintained. Immediately the temperature of the cable began to increase, and as it did so, the pressure of the air trapped in the voids of the extruded polyethylene insulation also increased. Coincidentally the power factor fell sharply, reaching a minimum of 0.05% at about 2 hours (by which time the temperature of the conductor had reached 68° C.). The current was kept on until the conductor temperature reached 85° C. at 3¾ hours, when it was turned off. The conductor temperature thereupon began to fall rapidly again toward room temperature, and at once the power factor began to rise steeply, reaching about 1.25% at 4¾ hours.

The dashed curve of Fig. 6 thus shows how a thermally produced increased pressure within the cable system brings about a drastic improvement in power factor, but an improvement which lasts only so long as current is passing through the cable to keep it heated and so to keep the pressure up.

Now referring to the solid curve of Fig. 6, a cable arranged for controlling the pressure on both inside and outside surfaces of the insulating jacket was operated for the first 2¼ hours in the same fashion, and at the same voltage stress, as the cable to which the dashed curve relates. As shown by the solid curve, the power factor remained approximately constant at 1.5% from zero hour to ¾ hour, and then when the current was turned on and the cable temperature increased (full voltage stress being maintained), the power factor fell sharply to 0.05%. From 2¼ hours to 2¾ hours, compressed air at five pounds per square inch above atmospheric was introduced into the cable system, with no effect on the power factor. Similar results were noted from 2¾ hours to 3¼ hours, and from 3¼ hours to 3¾ hours, during which periods the pressure was increased, respectively, to ten and fifteen pounds per square inch. During all of this period, the current was on. When at 3¾ hours the current was turned off but the pressure kept at fifteen pounds per square inch (and still with full voltage stress applied), there was no increase in power factor, as was the case with the cable operated at atmospheric pressure. The power factor remained constant at 0.05% until 6¼ hours, when the pressure was reduced to ten pounds per square inch. Almost at once the power factor increased to 0.25% and remained steady at this value until 6¾ hours, when the pressure was further reduced to five pounds per square inch. Again a sharp rise in power factor occurred to 0.95%. It remained steady at this value until 7¼ hours, when the pressure was reduced to atmospheric. Thereupon a final sharp rise in power factor to 1.3% occurred.

The solid curve thus shows that by applying pressure mechanically both to the inside and to the outside of the insulating layer, the power factor may be kept at a desirable low value at all times.

The benefits of maintaining the extruded plastic insulation under pressure applied both to its inside and outside surfaces goes beyond the matter of greatly improving the power factor of the cable. Cyclic life tests have shown that the life of the cable is enormously increased by the application of gas pressure. In these tests, polyethylene insulated cables were operated continuously at two and one-half times maximum rated voltage, and current was passed through them for 9 hours out of each 24, the magnitude of the current being regulated to bring the conductor temperature to 85° C. and keep it there during the period that current was on. During the balance of the 24-hour cycle the cable was allowed to cool to room temperature. Two cables that were operated at atmospheric pressure failed under the conditions of this test after two and twelve cycles respectively. A third cable essentially identical with these two, except that air at a pressure of fifteen pounds per square inch acted at all times on both the inside and outside surfaces of the insulation, and tested under exactly the same conditions, still showed no signs of failure after forty four cycles. The test voltage applied to this cable was increased after the forty fourth cycle to three times the rated value (i. e., to about 140 volts per mil of insulation thickness), and after thirty three additional cycles at this higher operating voltage, it still showed no signs of failure.

It has been emphasized above that in power cables according to the invention the pressure exerted on the inside of the tubular layer of insulation is substantially equal to the pressure exerted on the outside thereof. Tests have shown that a superatmospheric pressure which is substantially equalized as between the inside and outside of the insulation is necessary in order to develop maximum dielectric properties, and in order for the cable to have more than a very short life. Fig. 7, which is a chart showing how the power factor of a cable varies with the pressure applied thereto, and how the power factor is affected depending on whether the pressure is applied to one side only or on both sides of the insulating layer, graphically illustrates this point. All curves of Fig. 7 were determined on cable insulated with extruded polyethylene, $\frac{5}{32}$ inch thick, and operated under an electrical stress of 91 volts per mil of insulation thickness, corresponding to a total applied voltage of almost 15,000.

The upper dash-dot curve of Fig. 7 refers to a theoretical cable operated at various superatmospheric pressures applied only to the outside of the polyethylene insulating layer. The curve should be a horizontal straight line, as shown, indicating that pressure applied only to the outside of the jacket has little or no effect on the power factor of the cable. The dashed intermediate curve relates to an actual cable to which various superatmospheric pressures were applied only through the conductor to the inside of the tubular layer of insulation, the outside of the jacket being at all times at atmospheric pressure. The power factor decreased considerably as the pressure was increased from atmospheric to twenty pounds per square inch above atmospheric, but a further increase to twenty-five pounds per square inch caused the power factor to increase again.

The shapes of the two upper curves of Fig. 7 are explained on the basis that the voids present in the extruded polyethylene layer were present mostly very close to the conductor (we have observed that this is generally so with thick extruded jackets, and is especially noticeable when the insulation is of extruded polyethylene). Pressures up to twenty-five pounds per square inch applied only to the outside of a thick layer of insulation do not significantly increase the pressure of the air or other gas trapped within these voids, because the rather thick void-free outer portion of the layer protects them from feeling the effect of such pressure. When the pressure is applied through the conductor to the inside of this layer, it at first increases the pressure of the gas trapped within the voids near the conductor, leading to a decrease in the power factor. But when the pressure becomes great enough to cause the insulation to distend and separate somewhat from the conductor, the effect is to increase the power factor again.

The effect of pressure applied both inside and outside the insulation of an actual cable is shown in the solid curve of Fig. 7. Here it is seen that as the pressure increases up to fifteen pounds per square inch, there is a very sharp decline in the power factor from 1.5% to 0.05%, which low power factor remains substantially constant as the pressure is further increased above fifteen pounds per square inch. Evidently the equalized pressure on both sides of the insulation results in placing the voids under a substantial pressure, while at the same time preventing any separation thereof from the conductor. The objectionably high power factor caused by the presence of the voids thus is overcome without introducing any further complication due to distention of the insulation away from the conductor.

Cables made in accordance with the invention possess a considerable number of advantages over cables of the oil-impregnated type that heretofore have been almost exclusively used for main power distribution circuits in metropolitan areas. Since the insulation is a monolithic non-fluid plastic, no voids develop within it after it has been placed in service; and the voids or bubbles that are formed during extrusion are kept from doing any harm by the applied fluid pressure. The non-fluid character of the extruded plastic insulation insures that riser sections of a cable installation will cause no difficulty due to void formation. Such sections of an installation of the new cable are as trouble-free as horizontal sections, whereas with oil-paper insulated cables they are particularly troublesome sections of the installation. For these reasons alone, therefore, the new cable is much less likely to fail in service than a cable insulated with oil-impregnated paper tapes.

The advantages of the new cable over oil-impregnated paper insulated cable do not end with its freedom from trouble due to void formation. The very low power factor (about 0.05%) which is readily achieved in cable installations according to the invention compares with a power factor of 0.6% to 1% which is about the best that can be attained at full load in an installation of carefully made and installed oil-impregnated paper insulated cable. Consequently, with cables insulated in accordance with the invention, using extruded polyethylene (which has a dielectric constant about one-half that of paper), the dielectric losses amount to only about one-fortieth to one-twentieth that of the best oil-paper insulated cables.

The new cable is easier to manufacture than oil-impregnated paper insulated cable, because the extrusion operation by which the insulation is applied is no more difficult to perform than the application of paper tapes, and the commercial difficulties involved in securing thorough saturation of paper tapes with oil are eliminated. Since the insulation is dry and non-absorbent, it is not necessary to apply the sheath immediately after the insulation has been applied; and in fact insulated conductors for the new cable may be stored and even sold to the trade without a sheath. The sheath may be permanently installed before the insulated conductors are drawn into it. In the event of any need to replace the conductors, they can be withdrawn from the sheath, and new conductors may be drawn into it, thus avoiding the need for scrapping the sheath along with the conductors. The possibility of using any pressure-tight tubular housing for the sheath, such as solid pipe or strip-wound flexible metal hose, as well as conventional extruded lead, is in itself a considerable advantage.

The provision of gas under pressure within the cable sheath has the incidental advantage that if any break or leak of major proportions develops in the sheath prolonged and excessive operation of the compressor, or a drop in the gas pressure, affords prompt warning that such has occurred, so that the leak can be repaired before any damage is done to the cable. Meanwhile the gas escaping through the sheath prevents the ingress of moisture.

We claim:

1. Power cable comprising a conductor that is fluid-permeable throughout its length, a layer of solid fluid-impermeable plastic insulation surrounding the conductor, a fluid impermeable sheath surrounding the insulation, the sheath being spaced from the insulation to provide a fluid passage throughout the length of the cable, said fluid passage being in fluid-transfer communication with the interior of said fluid-permeable conductor, fluid under superatmospheric pressure within the conductor and exerting such pressure on the inner surface of the insulation adjacent the conductor, and fluid under essentially the same superatmospheric pressure in said fluid passage and exerting on the outer surface of the insulation substantially the same pressure as is exerted on the inner surface thereof.

2. Power cable comprising a stranded conductor that is permeable transversely and throughout its length to the flow of gas, a layer of solid gas-impermeable plastic insulation surrounding the conductor, a gas impermeable sheath surrounding the insulation, the sheath being spaced from the insulation to provide a gas passage throughout the length of the cable, said gas passage being in gas-transfer communication with the interior of said gas-permeable conductor, gas under a pressure approximating 20 pounds per square inch above atmospheric within the conductor and acting on the inner surface of the insulation adjacent the conductor, and gas in said gas passage acting on the outer surface of the insulation at substantially the same superatmospheric pressure.

3. A multiconductor power cable comprising a plurality of stranded conductors each of which is permeable laterally and longitudinally to the flow of gas, a layer of solid gas-impermeable plastic insulation surrounding each conductor, a gas impermeable sheath surrounding the insulated conductors, the valley spaces between adjacent conductors and the sheath being open to the flow of gas, said valley spaces being in gas-transfer communication with the interior of each of said gas-permeable conductors, and gas at a superatmospheric pressure inside each conductor and in the valley spaces, the gas being at substantially the same pressure inside each conductor and in the valley spaces so that both the inner surface and the outer surface of the layer of insulation about each conductor is subjected to essentially the same gas pressure.

4. Power cable comprising a stranded conductor permeable both laterally and longitudinally to the flow of gas, a layer of solid extruded polyethylene plastic insulation surrounding the conductor, a gas-tight sheath surrounding the insulated conductor and spaced therefrom to provide a gas passage extending the length of the cable between the outer surface of the polyethylene layer and the sheath, said gas passage being in gas-transfer communication with the interior of said gas-permeable conductor, a gas under superatmospheric pressure inside the conductor and acting on the inner surface of the polyethylene layer adjacent the conductor, and a gas under superatmospheric pressure in the gas passage and exerting pressure on the outer surface of the polyethylene layer adjacent the sheath, the gas pressure being essentially the same on both the inside and outside of said polyethylene layer.

5. Power cable comprising a stranded conductor permeable both laterally and longitudinally to the flow of gas, a layer of solid extruded polyethylene plastic insulation surrounding the conductor, a gas-tight sheath surrounding the insulated conductor and spaced therefrom to provide a gas passage extending the length of the cable between the outer surface of the polyethylene layer and the sheath, said gas passage being in gas-transfer communication with the interior of said gas-permeable conductor, and substantially dry air at a pressure approximating 20 pounds per square inch above atmospheric both inside the conductor and in the gas passage, said air exerting essentially the same pressure on both the inner surface of the polyethylene adjacent the conductor and on the outer surface thereof adjacent the sheath.

6. Power cable comprising a flexible stranded conductor permeable both laterally and longitudinally to the flow of a fluid, a layer of solid fluid-impermeable plastic insulation surrounding the conductor, a loosely fitting sheath composed essentially of substantially fluid-tight flexible metal hose surrounding the insulated conductor, the interior of said sheath outside said layer of insulation being in fluid-transfer communication with the interior of said fluid-permeable conductor, and fluid under superatmospheric pressure both within the conductor and between the sheath and the insulated conductor, said fluid exerting essentially the same pressure both on the inner surface of the insulation adjacent the conductor and on the outer surface thereof adjacent the sheath.

7. Power cable comprising a flexible stranded conductor permeable both laterally and longitudinally to gas flow, a monolithic layer of solid polyethylene plastic insulation surrounding the conductor, a loosely fitting sheath of flexible substantially gas-tight strip wound metal hose surrounding the insulated conductor, the interior of said sheath outside said layer of polyethylene insulation being in gas-transfer communication with the interior of said gas-permeable conductor, and gas under a pressure approximating 20 pounds per square inch both inside the conductor and between the sheath and the insulated conductor, said gas exerting essentially the same pressure both on the inner surface of the polyethylene insulation adjacent the conductor and on the outer surface thereof adjacent the sheath.

8. A power cable installation comprising a cable having a stranded conductor permeable both laterally and longitudinally to the flow of gas, a layer of solid gas-impermeable plastic insulation surrounding the conductor, and a gas-tight sheath surrounding the insulated conductor and spaced therefrom to provide a gas passage for the length of the cable between the sheath and the plastic insulation, a cable fitting having a gas-tight casing secured in gas-tight relation to the cable sheath at the end of a length of the cable, the cable conductor extending into the interior of said fitting casing and being bared of insulation therein and the cable gas passage communicating with the interior of said fitting casing, and a source of gas at superatmospheric pressure connected with the interior of the fitting casing, whereby gas under the same superatmospheric pressure is admitted both to the interior of the conductor through the bared portion thereof and to the cable gas passage and exerts essentially the same superatmospheric pressure both on the inside of the plastic insulation layer adjacent the conductor and on the outside thereof adjacent the cable sheath.

9. A power cable installation comprising a cable having a stranded conductor permeable laterally and throughout its length to the flow of gas, a monolithic layer of solid polyethylene plastic insulation surrounding the conductor, and a gas-tight sheath surrounding the insulated conductor and spaced therefrom to provide a gas passage throughout the length of the cable between the sheath and the polyethylene insulation, a cable fitting having a gas-tight casing secured in gas-tight relation to the cable sheath at the end of a length of the cable, the cable conductor extending into the interior of said fitting casing and being bared of insulation therein and the cable gas passage communicating with the interior of the fitting casing, and an air compressor connected through desiccating apparatus with the interior of the fitting casing, whereby dry air at a superatmospheric pressure may be admitted both to the interior of the conductor through the bared portion thereof and to the cable gas passage so as to exert essentially the same superatmospheric pressure throughout the length of the cable both on the inside of the polyethylene layer adjacent the conductor and on the outside thereof adjacent the cable sheath.

10. A power cable installation comprising a cable having a flexible stranded conductor permeable both laterally and throughout its length to the flow of gas, a layer of solid fluid-impermeable plastic insulation surrounding the conductor, a flexible loosely fitting substantially gas-tight metal hose surrounding the insulated conductor as a sheath therefor, a cable fitting having a gas-tight casing connected in gas-tight relation to the flexible metal hose, the cable conductor extending into said casing and being bared therein of insulation, and a source of gas under superatmospheric pressure communicating with the interior of said casing, whereby gas at the same superatmospheric pressure is admitted both to the interior of the conductor through the bared portion thereof and to the interior of the metal hose outside the insulated conductor and exerts essentially the same superatmospheric pressure both on the inner surface of the insulation adjacent the conductor and on the outer surface thereof adjacent the metal hose.

EUGENE WILLIS GREENFIELD.
AMOS CLARENDON CONNELL.

References Cited in the file of this patent
UNITED STATES PATENTS

| Number | Name | Date |
|---|---|---|
| 1,231,568 | Clark | July 3, 1917 |
| 1,326,049 | Green | Dec. 23, 1919 |
| 1,866,611 | Affel | July 12, 1932 |
| 2,068,940 | Wiseman | Jan. 26, 1937 |
| 2,085,563 | Aime | June 29, 1937 |
| 2,095,090 | Aime | Oct. 5, 1937 |
| 2,116,643 | Rost | May 10, 1938 |
| 2,186,445 | Bennett | Jan. 9, 1940 |
| 2,186,793 | Wodtke | Jan. 9, 1940 |
| 2,255,832 | Thompson | Sept. 16, 1941 |
| 2,304,210 | Scott et al. | Dec. 8, 1942 |
| 2,377,153 | Hunter et al. | May 29, 1945 |

FOREIGN PATENTS

| Number | Country | Date |
|---|---|---|
| 404,519 | England | Jan. 18, 1934 |
| 731,172 | France | May 24, 1932 |